Figure 2:
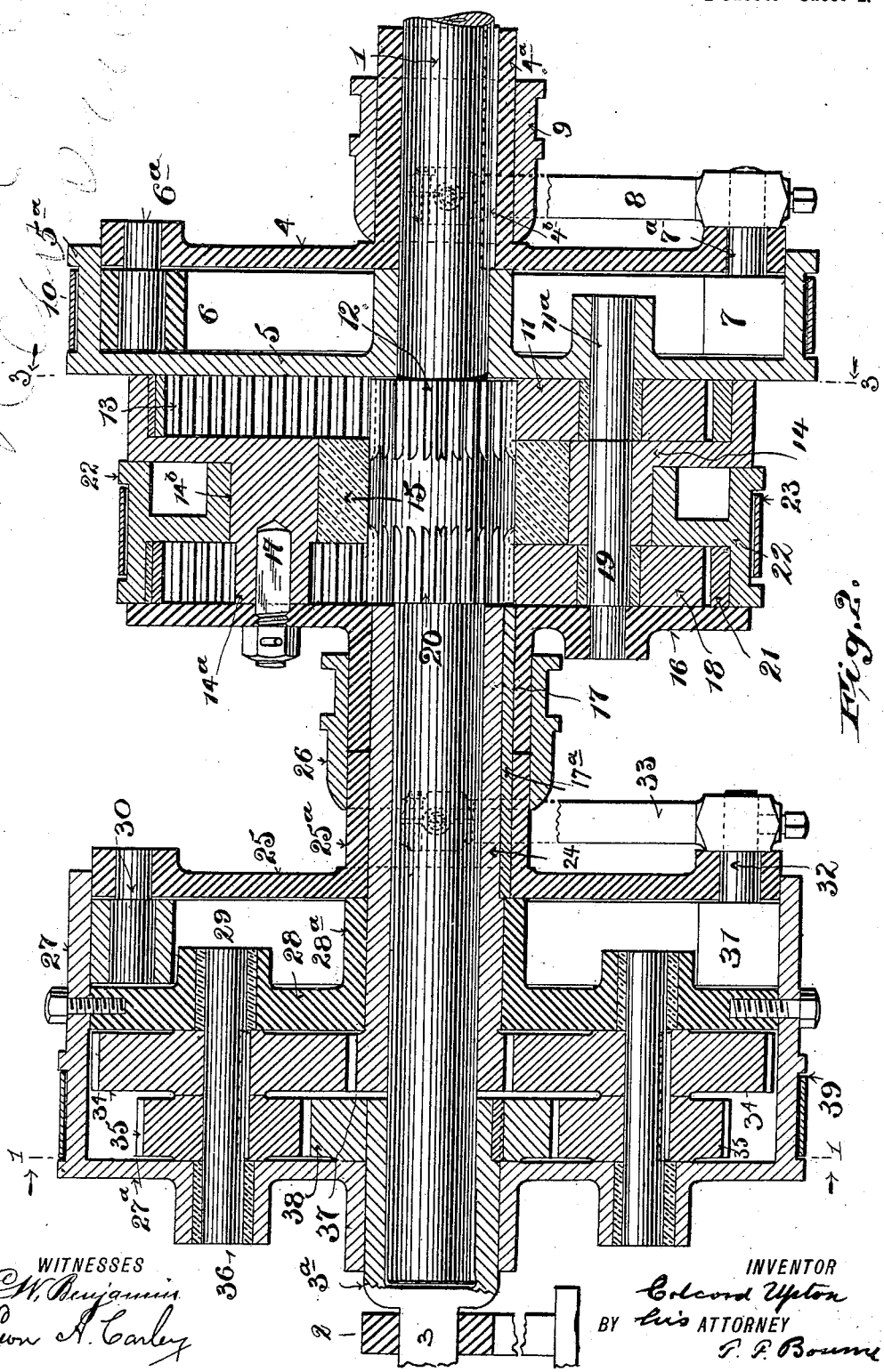

No. 691,508. Patented Jan. 21, 1902.
C. UPTON.
VARIABLE SPEED GEARING.
(Application filed Oct. 29, 1901.)
(No Model.) 2 Sheets—Sheet 1.
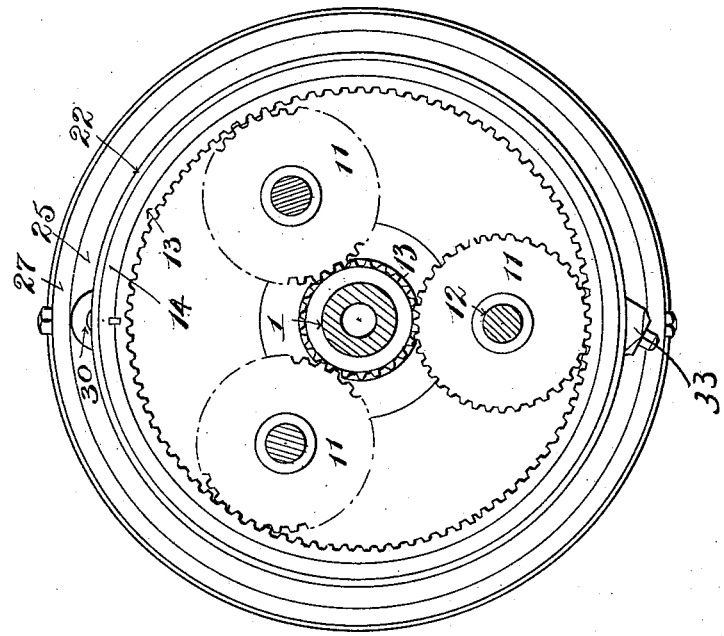
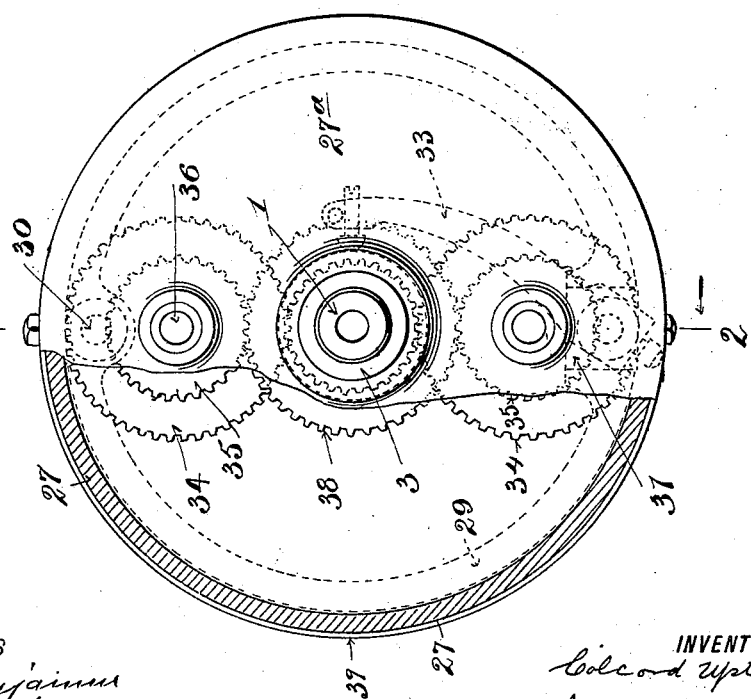
WITNESSES
INVENTOR
BY his ATTORNEY No. 691,508. Patented Jan. 21, 1902.
C. UPTON.
VARIABLE SPEED GEARING.
(Application filed Oct. 29, 1901.)

(No Model.) 2 Sheets—Sheet 2.

WITNESSES
INVENTOR
Colcord Upton
BY his ATTORNEY

UNITED STATES PATENT OFFICE.

COLCORD UPTON, OF BEVERLY, MASSACHUSETTS, ASSIGNOR TO UPTON MACHINE COMPANY, A CORPORATION OF NEW YORK.

VARIABLE-SPEED GEARING.

SPECIFICATION forming part of Letters Patent No. 691,508, dated January 21, 1902.

Application filed October 29, 1901. Serial No. 80,415. (No model.)

*To all whom it may concern:*

Be it known that I, COLCORD UPTON, a citizen of the United States, and a resident of Beverly, Essex county, State of Massachusetts, have invented certain new and useful Improvements in Variable-Speed Gearing, of which the following is a specification.

The object of my invention is to provide a variable-speed gearing wherein various speeds both in a forward and reverse direction can be produced, as from a constantly-rotating source of power; and to this end the invention comprises the novel details of improvement that will be more fully hereinafter set forth, and then pointed out in the claims.

Reference is to be had to the accompanying drawings, forming part hereof, wherein—

Figure 1 is an end view, partly broken, looking from the left in Fig. 2, of a gearing embodying my invention. Fig. 2 is a vertical longitudinal section, enlarged, on the plane of the line 2 2 in Fig. 1; and Fig. 3 is a cross-section on the line 3 3 in Fig. 2 looking in the direction of the arrows.

Similar numerals of reference indicate corresponding parts in the several views.

In the accompanying drawings the numeral 1 indicates a shaft which may be supported in suitable bearings and which may be rotated in any desired manner, and around said shaft the gearing is located. The shaft 1 through the gearing hereinafter described is intended to transmit motion to a part to be driven, which may be any suitable power-transmitting element, which I term the "driven part," and which is shown as an extension 3 of a sleeve $3^a$, mounted to rotate concentrically with the shaft 1, the part 3 being shown provided with a bearing 2. To the shaft 1 is secured a support 4, which may be in the form of a disk provided with a hub or sleeve $4^a$, connected with the shaft 1 by a key or other fastening $4^b$.

5 is a disk or drum mounted to rotate freely around shaft 1, and its rim $5^a$ is adapted to be firmly connected with shaft 1, so that they will rotate in unison, and for this purpose I have shown a split friction-ring 6, carried by the support 4, as by a stud $6^a$, and between the separated ends of said ring is located a spreader, shown in the form of a block having a pivotal portion $7^a$, journaled in a bearing on the disk or support 4, the portion $7^a$ being provided with an arm 8, whose outer end extends over shaft 1 and is adapted to be engaged by a cam-sleeve 9, that is mounted to slide upon the sleeve $4^a$ and adapted to pass under arm 8 in well-known manner, whereby when the arm 8 is moved outwardly the split ring 6 will be caused to frictionally connect shaft 1 with the drum 5, and when arm 8 is not so pressed outwardly the parts 1 and 5 will be free to rotate independently. It is evident, however, that other devices may be used for frictionally connecting the parts 1 and 5.

For the purpose of holding the drum 5 from rotation I preferably provide a friction-band 10, located in a groove in the surface of said drum and adapted to be operated in well-known manner. The drum or member 5 carries one or more pinions 11, mounted to rotate upon supporting-shafts $11^a$, carried by said member, which pinions are in mesh with a gear 12 on shaft 1 and with an annular rack 13, carried by a ring or annulus 14, mounted to rotate freely around shaft 1. By preference the ring 14 is guided upon a bearing 15, secured to shaft 1, and the annulus 14 is connected with a support or disk 16, that has a sleeve or hub 17, mounted to rotate independently of shaft 1 and concentrically therewith. The parts 14 and 16 are shown connected together by bolts or screws 17, engaging extensions $14^a$ from the part 14, thereby providing a space in which pinions 18 are located. Said pinions are journaled upon shafts 19, carried by the parts 14 and 16, whereby said pinions are free to rotate in said space, and the parts are maintained in their relative positions. This particular construction of parts may, however, be varied, if desired. The pinions 18 are in mesh with a gear 20 on shaft 1 and also with an annular rack 21, carried by a loose ring 22, which finds a bearing upon an annular rim or seat $14^b$ on the member 14. By means of a brake-band 23 the rack 21 and its supporting-ring 22 can be held from rotation or the rotation limited, as desired, said brake-band being capable of being operated in any well-known manner.

With the parts so far described it will be understood that if the friction-clutch is operated by the arm 8 the parts will all be locked firmly together, so that the sleeve 17 will rotate at the same speed as shaft 1, and by lessening the friction intermediate speeds may be produced; but when said friction is released and the brake 23 is set the rack 21 will be kept from rotation, and the gear 20, through the pinions 18, will cause the sleeve 17 to rotate in the same direction as shaft 1, but at a slower speed than the latter. When said friction devices or the band 23 are not set and the brake-band 10 is caused to grip the drum or member 5, the pinions 11 will be held from movement bodily around shaft 1, and thereupon gear 12 will rotate them upon their axes, and they will in turn communicate rotation to rack 13, which by being connected with sleeve 17 will cause the same to rotate in the direction reverse to the direction of shaft 1, but at a slower speed than the latter.

The sleeve or hub 17 is caused to operate the driven part 3 by means of interposed gearing and locking devices, whereby the driven part can be rotated at the same speed as the sleeve 17 and at different speeds, and to this end I provide devices arranged as follows: To the sleeve 17 is secured a disk or support 25, which is shown provided with a hub 25$^a$, keyed to said sleeve, as by a key 17$^a$, and the parts 17 and 25$^a$ are secured to a sleeve 24, as by said key 17$^a$. 26 is a cam-like sleeve, shown adapted to slide along parts 17 and 25$^a$. A drum or member 27 is mounted to rotate concentrically around shaft 1, and said member is shown provided with a hub mounted to rotate around sleeve 3, and the drum or member 27 is shown provided with a supporting member 28, located between the support 25 and the web 27$^a$ of drum 27. The part 28 is shown as having a hub 28$^a$, journaled upon sleeve 24. The drum 27 is thus maintained in proper rotative position to avoid twisting strains. The drum or member 27 is to be locked to the sleeve 17 to cause them to rotate at the same speed, and for this purpose I have shown friction devices arranged similarly to those described with respect to the drum 5, and comprising a split ring 29, fitting within the drum 27 and adapted to engage the same and supported by a pivot 30, secured to the support 25, and between the split ends of said ring is a spreader 31, carried by a shaft 32, journaled in a bearing on support 25 and provided with an arm 33 to be operated by the sleeve 26, the arrangement being such that when sleeve 26 is slipped under arm 33 the parts 25 and 27 will be locked to rotate in unison, and by varying the pressure of the friction devices upon drum 27 intermediate speeds can be derived, and whereby also when the arm 33 is not operated by sleeve 26 the parts 25 and 27 can rotate independently in either direction. The drum 27 also carries one or more pairs of pinions 34 35, which are shown secured to a shaft 36, shown journaled in bearings on the parts 27 28. The pinion 34 meshes with a gear 37, secured to the sleeve 24, and the pinion 35 meshes with a gear 38, secured to the sleeve 3. The drum 27 is intended to have its rotation limited or checked for producing certain speeds, and for this purpose a brake-band 39 may be used and operated in well-known manner.

The complete operation of my improvement above set forth may be described as follows: Shaft 1 being rotated continuously in one direction and the drum 5 connected therewith by the associate friction devices, sleeve 17 is caused to rotate at the same speed as the shaft, and then if the friction devices 29, &c., are operated to lock the drum 27 to sleeve 17 the driven part will be rotated at the same speed and in the same direction as said shaft, because the pinions 34 35 will be locked, and through them the gear 37 will cause gear 38, and thereby the driven part, to rotate the same as sleeve 17, giving the high rotation of the driven part. If the drum 5 be connected with shaft 1, as stated above, and drum 27 is held from rotation by band 39, the gear 37 will cause pinions 34 35 to rotate gear 38, and thereby the driven part, at a slower speed than sleeve 17 and in the same direction, which produces the second highest forward speed of the driven part. If while drum 27 is locked to sleeve 17 the friction devices 6, &c., be not set, but the rack 21 held from rotation by the band 23, shaft 1 through the gears 20 and 18 will cause sleeve 17 to rotate in the same direction as the shaft, but at a reduced speed, and thereupon the driven part will be rotated by means of gears 34 35 37 38 in the same direction as sleeve 17, giving a still lower speed to the driven part than that last above stated and in the same direction as shaft 1. If now the band 23 be held as just stated, and the drum 27 released from the sleeve 17, and the band 39 set, the drum 27 will be held from rotation, and as sleeve 17 will now be rotated forwardly relatively slow by gears 20 and 18 the gear 37 will rotate pinions 34 35 on their axes, and thereupon gear 38 will be rotated in the same direction as sleeve 17, but at a reduced speed, thus rotating the driven part forwardly at a speed slower than the speed of sleeve 17, thus giving the slow forward speed to the driven part.

From the foregoing it will be understood that by applying the friction devices and bands in the manner set forth the driven part may be rotated forwardly or in the direction of rotation of shaft 1 at four different speeds, and it will also be apparent that if while the parts are set for either of said speeds friction be allowed to slip, more or less, lower speeds may be produced than those provided for by the gearing when the parts are firmly locked.

The reverse speeds of the driven part are effected as follows: The band 10 is set to keep the drum 5 from rotation, and at the same time drum 27 is locked to its support 25 by the friction devices, and thereupon gear 12 will rotate pinion 11 on its axis, and as said pinion meshes with rack 13 the latter will be caused to travel around shaft 1 in the direction reverse to the direction of said shaft, thereby also carrying the sleeve 17 in such direction, and the latter through the drum 27 and the gears 37 34 35 38 (which are now held from independent rotation) will carry the driven part in the same direction and at the same speed as sleeve 17. A further reverse slower speed of the driven part may be produced by holding drum 5 from rotation, as stated above, and not connecting the drum 27 with sleeve 17, but checking the rotation of said drum by band 39, whereupon sleeve 17, rotating in the direction above indicated, will cause gear 37 to transmit through pinion 34 35 rotation to gear 38, and thus to the driven part, in the same direction as the rotation of sleeve 17, but at a reduced speed due to the ratio of said gearing. Thus two speeds are provided for to rotate the driven part in the reverse direction to the direction of rotation of the driving part or shaft 1. If while in the positions described above either of the friction devices be held more or less, the driven part will rotate at a correspondingly slow or reduced speed.

The arrangements of the friction devices and bands may be varied from that shown, and the ratio of the gears and pinions to each other may be such as to produce the desired relative speeds, and other changes in construction and details may be made without departing from the spirit of my invention.

Having now described my invention, what I claim is—

1. A gearing of the character described comprising a driving part, a rotative member, means for operating the latter by the former at the same speed and at different speeds, a driven part, means for operating the latter at the same speed as said member, and means for operating the driven part at speeds different from the speed of said member, substantially as described.

2. A gearing of the character described comprising a driving part, a rotative member, means for operating the latter by the former in the same direction as the driving part and at varying speeds, means for rotating said member in a direction reverse to the direction of rotation of the driving part, a driven part, means for rotating the latter at the same speed as said member in either direction, and means for rotating the driven part by said member at a speed different from the latter, substantially as described.

3. The combination of a driving part, a driven part, two sets of gearing interposed between said parts, means associated with each set of gearing for locking the driving part in connection with the driven part to rotate them at the same speed, and means associated with each set of gearing for causing the driven part to be operated by the action of either set of gearing, substantially as described.

4. The combination of a driving part, two sets of gearing, a driven part, means for locking the driving part in connection with the driven part to rotate the latter at the same speed as the former, means for operating the driven part through one set of gearing while the driving part is locked to the other set of gearing, means for locking the driven part to one set of gearing while operating the driven part through the other set of gearing, and means for operating the driven part through both sets of gearing operating simultaneously, substantially as described.

5. The combination of a driving part, gearing to be operated thereby, a driven part, gearing interposed between the latter and the first-mentioned gearing, means for locking the driven part in connection with the first-mentioned gearing, and means for limiting bodily rotation of part of the first-mentioned gearing for operating the driven part at a speed different from that produced by the first-mentioned gearing, substantially as described.

6. The combination of a driving part, a rotative member, gearing for operating the same by the driving part, a gear connected with said member, a driven part, gearing for operating the driven part by said gear, means for limiting bodily rotation of part of said gearing, and means for locking said member in connection with the driven part, substantially as described.

7. The combination of a driving part, a rotative member, means for rotating the same by the driving part at different speeds and in the same direction as the latter, means for rotating said member in a direction reverse to the direction of rotation of the driving part, a driven part, gearing interposed between the latter and said member, means for locking the driven part in connection with said member to operate the former at the same speed as said member, and means for limiting bodily rotation of part of said gearing for rotating the driven part at a speed different from the speed of rotation of said member, substantially as described.

8. The combination of a driving part, a rotative member, means for rotating the same by the driving part at different speeds and in the same direction as the latter, means for rotating said member in a direction reverse to the direction of rotation of the driving part, a driven part, a gear connected with said member, gearing interposed between said gear and the driven part, means for locking the driven part in connection with said member, and means for causing said gearing to operate the driven part, substantially as described.

9. The combination of a driving part, a rotative member, means for rotating the same by the driving part at different speeds and in the same direction as the latter, means for rotating said member in a direction reverse to the direction of rotation of the driving part, a driven part, a gear connected with said member, a gear connected with the driven part, a rotative support carrying pinions meshing with said gears, means for limiting rotation of said support, and means for locking said support in connection with said member, substantially as described.

10. The combination of a driving part, a rotative member, means for rotating the same by the driving part at different speeds and in the same direction as the latter, means for rotating said member in a direction reverse to the direction of rotation of the driving part, a driven part, a gear connected with said member, a rotative support, a pair of pinions carried thereby and in mesh with said gears, means to limit rotation of said support, friction devices rigidly connected with said member and adapted to lock said member to said support, and means for operating said friction devices, substantially as described.

11. The combination of a shaft, a drum, friction devices for connecting said shaft and drum, a gear carried by said shaft, a pinion carried by said drum, a rack in mesh with said pinion, a rotative member connected with said rack, a pinion connected with said member, a gear carried by the shaft in mesh with said pinion, a loose rack in mesh with said pinion, means for limiting rotation of said drum and said loose rack, a driven part, gearing interposed between said driven part and said member, and means for locking said driven part in connection with said member, substantially as described.

12. The combination of a shaft, a drum, friction devices for connecting said shaft and drum, a gear carried by said shaft, a pinion carried by said drum, a rack in mesh with said pinion, a rotative member connected with said rack, a pinion connected with said member, a gear carried by the shaft in mesh with said pinion, a loose rack in mesh with said pinion, means for limiting rotation of said drum and said loose rack, a driven part, gearing interposed between said driven part and said member, means for locking said driven part in connection with said member, and means for limiting rotation of part of said gearing, substantially as described.

13. The combination of a shaft, a drum, friction devices for connecting said shaft and drum, a gear carried by said shaft, a pinion carried by said drum in mesh with said gear, a rack in mesh with said pinion, a rotative member connected with said rack, a pinion connected with said member, a gear carried by the shaft in mesh with said pinion, a loose rack, a gear connected with said member, a driven part, a gear connected therewith, pinions in mesh with said gears, a rotative support for said pinions, means to limit rotation of said support, and means for locking said support in connection with said member, substantially as described.

COLCORD UPTON.

Witnesses:
SAMUEL H. STONE,
GEORGIE A. STONE.